G. F. J. COLBURN.
Bird Cage.
No. 99,164.  Patented Jan'y 25, 1870.
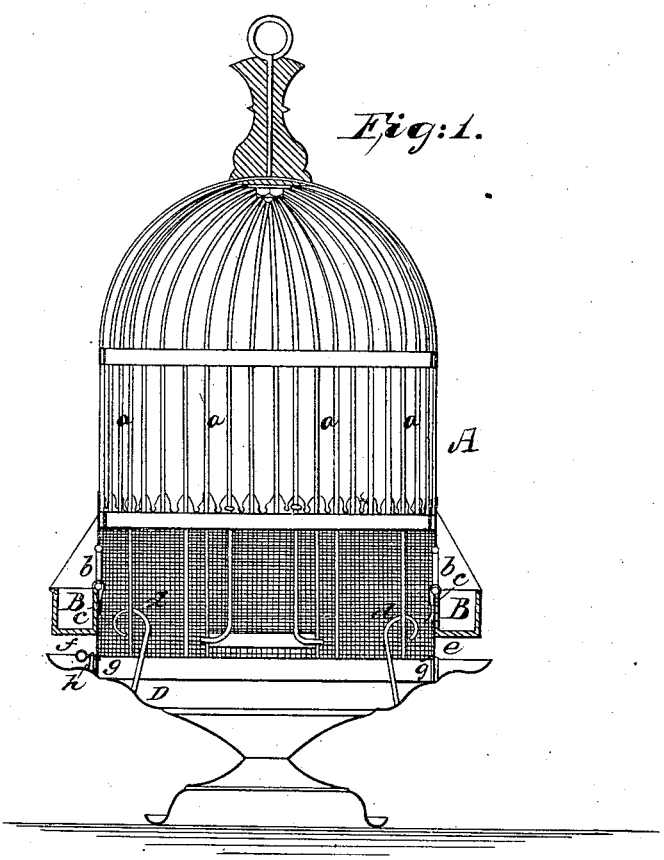
Fig: 1.
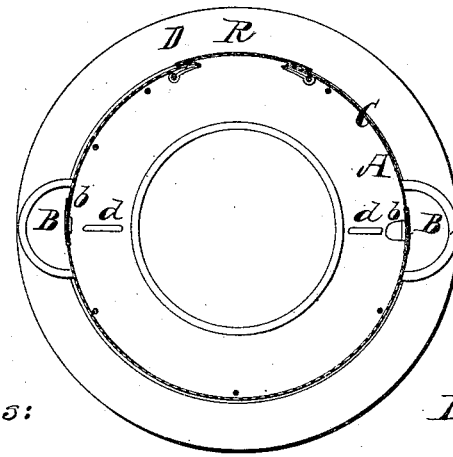
Fig: 2.
Witnesses:  
C. Wahlers  
E. F. Kastenhuber
Inventor:  
G. F. J. Colburn  
Van Santvoord & Hauff  
atty

United States Patent Office.

G. F. J. COLBURN, NEWARK, NEW JERSEY.

Letters Patent No. 99,164, dated January 25, 1870.

IMPROVED BIRD-CAGE.

The Schedule referred to in these Letters Patent and making part of the same.

To all whom it may concern:

Be it known that I, G. F. J. COLBURN, of Newark, in the county of Essex, and State of New Jersey, have invented a new and useful Improvement in Bird-Cages; and I do hereby declare the following to be a full, clear, and exact description thereof, which will enable those skilled in the art to made and use the same, reference being had to the accompanying drawing, forming part of this specification, in which drawing—

Figure 1 represents a vertical section of this invention.

Figure 2 is a horizontal section of the same.

Similar letters indicate corresponding parts.

This invention relates to a bird-cage, in which that section to which the feed-cups are attached, is made of wire gauze or perforated sheet-metal, in such a manner that the bird, while eating, is prevented from scattering portions of its food on the floor, round the cage, and the bird-cage can be placed in a good room without danger of soiling the carpet or the floor.

In the drawing, the letter A designates the body of my cage, which is partly made of wires, $a$, in the usual manner, while that section thereof to which the feed-cups B are attached, is made of wire-gauze or perforated sheet-metal, this close section C being provided with two holes, $b$, one on each side, while the feed-cups are furnished with hooks, $c$, which can be made to catch over the edges of said holes, as shown. The door R is made of the same material as section C.

By thus combining the feed-cups with the close section C, the bird, while eating, is prevented from scattering any seeds outside of the cage, and thus the cleanliness of the room in which the cage is placed is not disturbed.

By making the close section out of wire gauze, with an ornamental design, a novel and distinguishing appearance is given to my cage.

From the base, D, of my cage rise two standards, $d$, one opposite to each of the feed-cups, so that the bird is enabled to reach the contents of said feed-cups with ease and convenience.

These standards take the place of the rods ordinarily secured in bird-cages for the same purpose, and I prefer said standards, because the rods cannot be conveniently secured in the close section without marring its appearance.

The body, A, of my cage is connected to the base D by means of a fastening, which consists of a hook, $e$, and a thumb-screw, $f$, said hook and screw being made to catch on opposite sides, over the top of the base-ring $g$, of the body A.

The thumb-screw $f$ has its bearing in a standard, $h$, which rises from the base D, and if said screw is turned back, so as to clear the edge of the base-ring $g$, the body A can be detached from the base, and lifted off without trouble.

What I claim as new, and desire to secure by Letters Patent, is—

The lower section of a bird-cage, made of reticulated material, having openings $b\ b$, therein for the feed-cups, and a door, R, of the same materal, as set forth.

G. F. J. COLBURN.

Witnesses:
W. HAUFF,
C. WAHLERS.